United States Patent [19]

Schweitzer

[11] 4,090,227
[45] May 16, 1978

[54] TRANSIENT-PROTECTED SIGNAL DISTRIBUTION CIRCUIT

[75] Inventor: Joseph Gilbert Donald Schweitzer, Towaco, N.J.

[73] Assignee: Bell Telephone Laboratories, Incorporated, Murray Hill, N.J.

[21] Appl. No.: 782,348

[22] Filed: Mar. 29, 1977

[51] Int. Cl.² ............................................. H02H 9/02
[52] U.S. Cl. ................................... 361/57; 361/59; 361/84; 361/100; 361/104
[58] Field of Search ................. 361/54, 57, 59, 71, 361/84, 93, 100, 104, 111; 330/207 P; 179/78 A

[56] References Cited

U.S. PATENT DOCUMENTS

| | | | |
|---|---|---|---|
| 2,509,703 | 5/1950 | Stanton | 361/84 X |
| 2,693,566 | 11/1954 | Hooper | 361/84 X |
| 3,222,575 | 12/1965 | Dexter | 361/57 X |
| 3,359,434 | 12/1967 | Galluzzi | 361/55 |
| 3,551,745 | 12/1970 | Nicholas | 361/56 |
| 3,924,159 | 12/1975 | Hoover | 361/101 |

Primary Examiner—Harry E. Moose, Jr.
Attorney, Agent, or Firm—Joseph P. Kearns, Jr.

[57] ABSTRACT

A signal distribution circuit subject to high-level reverse-current transients is protected by the combination of a reverse-current sensor and a controlled current shunt. The sensor detects a potentially damaging reverse-current current surge and sends a control signal to the current shunt. The current shunt then diverts the surge away from the distribution amplifier which consequently can have a low power rating. After the transient subsides, the circuit is automatically reset to allow continuation of normal signal distribution.

8 Claims, 3 Drawing Figures

TRANSIENT-PROTECTED SIGNAL DISTRIBUTION CIRCUIT

BACKGROUND OF THE INVENTION

1. Field of the Invention

This invention relates to self-restoring fault isolation systems. More particularly, this invention relates to telephone tone amplifiers and tone distribution systems with combined fault isolation and self restoration to service of nonfaulted load circuits.

2. Description of the Prior Art

Most interest in fault isolation techniques is generated by two dominant concerns: a need for damage protection for the equipment associated with a faulty device, and the need to continue the operation of a main system regardless of the malfunctioning of a branch of the system.

Many different devices have been used to accomplish fault isolation in electrical systems, including the following: simple fuses, circuit breakers, relays (of both the normally open and normally closed types), and a variety of semiconductor circuits such as voltage clampers, and current limiting circuits.

The appropriateness of the use and placement of one or more of these devices depends upon the special features of the particular system under consideration; thus the possibilities fo creating ingenious combinations are myriad.

Telephone signal distribution apparatus are typical of systems that require both self protection and continuation of general service. For example, telephone central office equipment used to distribute the "call progress tones" (such as the dial tone, audible ring, and busy signal) is intended to serve many customers, and a defect in one or more of the customer loops should not be allowed to interfere with service to the remaining properly functioning loops.

The customer loops are comprised of a variety of possible loads that must be supplied with tone signals at various predetermined voltage levels. In order to provide output signals at these levels, it is necessary to have an output voltage level transformer with several voltage taps on its secondary winding. A difficulty with such an arrangement is that a fault ("short") occurring between the reference voltage ground level and any one of these taps will overload the transformer and decrease the voltage level at that tap as well as at the other taps. To avoid such an eventuality, each load is independently fused and one end of the secondary winding of the transformer is connected to a negative direct current (DC) potential source. This arrangement assures that the fuse in a faulty loop will be reliably and quickly blown by a large DC surge, thus isolating the defective load from the transformer.

The isolation technique described above is quite reliable, but it has the serious drawback of causing a high transient surge of reflected current to be generated in the primary of the transformer. This surge is transmitted through a coupling capacitor and into the output circuits of the power amplifier. This current surge is much higher than the maximum tone signal current that must be supplied by the power amplifier. Thus, the maximum current handling specification of the power amplifier is determined by the maximum value of the transient reflected current surge rather than by the maximum value of the amplifier's normal tone signal current. As a result, the power amplifier used in the prior art is necessarily a heavy duty amplifier which is rated for a power dissipation rating far above its normal operating output power. For example, in one embodiment of the prior art, a power amplifier rated at five watts is used to drive a one-watt load. These heavy duty amplifiers are expensive, bulky, discrete component-type circuits which are inconvenient to install and require specially trained technicians for maintenance and repair.

It is, therefore, an object of this invention to improve the efficiency, reliability, and maintainability of tone distribution circuits.

It is another object of this invention to provide a tone distribution circuit of decreased size, weight, and cost.

SUMMARY OF THE INVENTION

The invention is directed to a self-restoring, fault-isolating, signal distribution system. Reverse current sensing and current-controlled shunting circuits are placed between the driving amplifier and the voltage transformer to divert reverse current transients away from the amplifier output. When a transient dies out, the controlled current shunt is automatically open circuited and the distribution circuit returns to normal operation.

High-level current transients occur when a faulty load on the distribution transformer secondary causes a DC surge to blow a load fuse. This high-magnitude current surge is reflected back to the transformer primary and towards the low-power driving amplifier. The invention makes feasible the use of a driving amplifier whose output power rating is determined by its signal power requirements rather than by its ability to withstand high-magnitude current surges.

DETAILED DESCRIPTION

Figure 1:
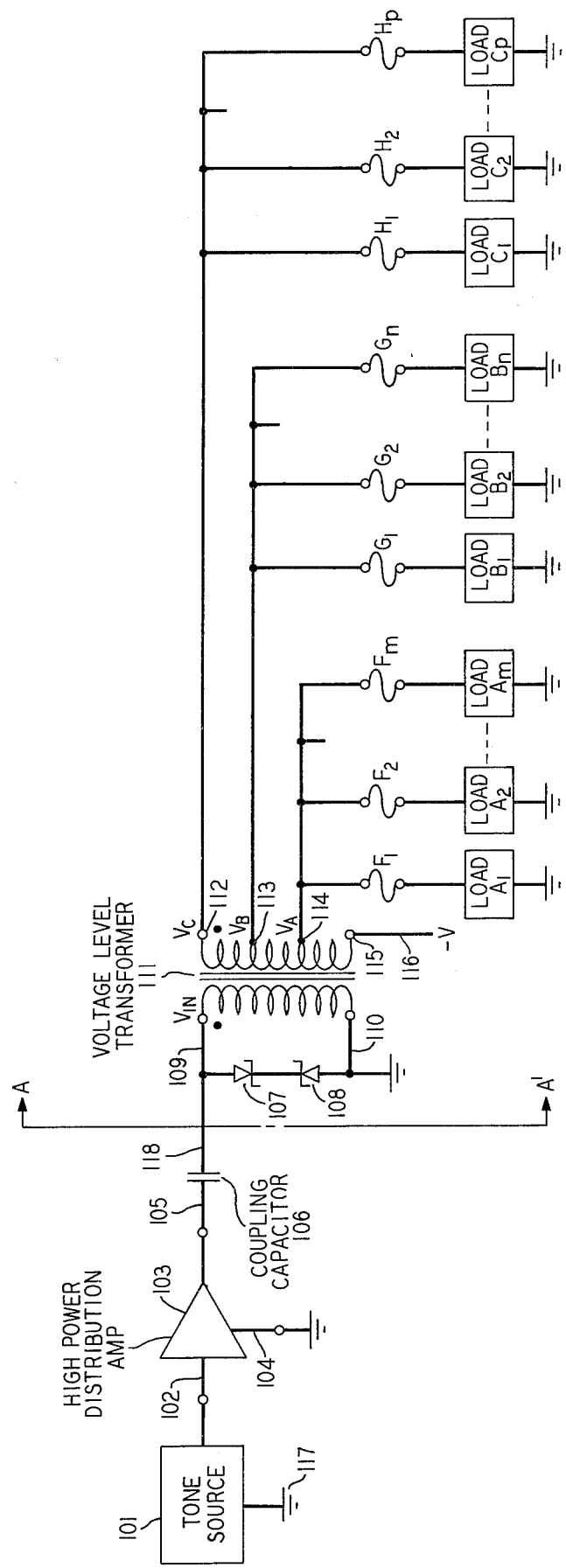
FIG. 1 shows a circuit diagram of an embodiment illustrative of the prior art in which a high power driving amplifier is used.

FIG. 1 shows a circuit diagram of an embodiment of a known tone distribution circuit which requires the use of a distribution amplifier whose output power rating is much higher than that required of an amplifier to provide tone signals only for the system.

The source of these signals is a tone generator 101 whose ground potential is connected to the common bus 117 and whose signal output is connected to the input lead 102 of the high-power distribution amplifier 103. The ground lead 104 of amplifier 103 is connected to the common bus 117, and the output of amplifier 103 is connected via lead 105 to coupling capacitor 106. This capacitor is connected via lead 118 to one input lead 109 of the voltage level transformer 111 as well as to the anode terminal of zener diode 107. The cathode of zener diode 107 is connected to the cathode of zener diode 108, and the anode of zener diode 108 is connected to the common bus as well as to the other input lead 110 of the voltage level transformer 111.

The voltage level transformer 111 has a plurality of secondary windings, whch are connected in series relation, with output terminals 112, 113, 114, and 115. Output terminal 115 is connected via lead 116 to a source of negative potential (−V). Output terminal 114 is connected to loads $A_1$ through $A_m$ via fuses $F_1$ through $F_m$, respectively, and the other terminals of these loads are connected to the common bus. Similarly, output terminals 113 and 112 are connected via fuses $G_1$ through $G_n$ and fuses $H_1$ through $H_p$ to loads $B_1$ through $B_n$ and $C_1$ through $C_p$, respectively.

Tone generator 101 generates a signal, such as a dial tone or a busy signal, and this signal is given power amplification by the high-power distribution amplifier 103. The amplifier output signal is coupled to the voltage level transformer by capacitor 106 and is distributed at different voltage levels $V_C$, $V_B$, and $V_A$ to the loads $C_1$ through $C_p$, and $B_1$ through $B_n$, and $A_1$ through $A_m$, respectively. Terminal 115 of the secondary winding is connected to the negative potential (−V) so that if a fault occurs in any of the loads, a high-magnitude current surge will occur which will cause the fuse associated with the faulty load to open instantaneously and reliably. The mentioned high-magnitude current is reflected back to the primary winding of the voltage level transformer and is carried via leads 109 and 118 through capacitor 106 to the output circuits of the high-power distribution amplifier 103. The zener diodes 107 and 108 serve to protect the amplifier output circuitry from high-magnitude voltage transients but do not function to divert the mentioned reverse-current surge. The reverse current surge is of a much larger magnitude than the normal output signal current values of the amplifier, so the amplifier's output power rating is determined not by the signal it is to supply but rather by the transient current surges that it must be able to absorb. This results in the inefficient use of an expensive discrete component high-power distribution amplifier which requires appreciable space and specially trained maintenance personnel.

Figure 2:
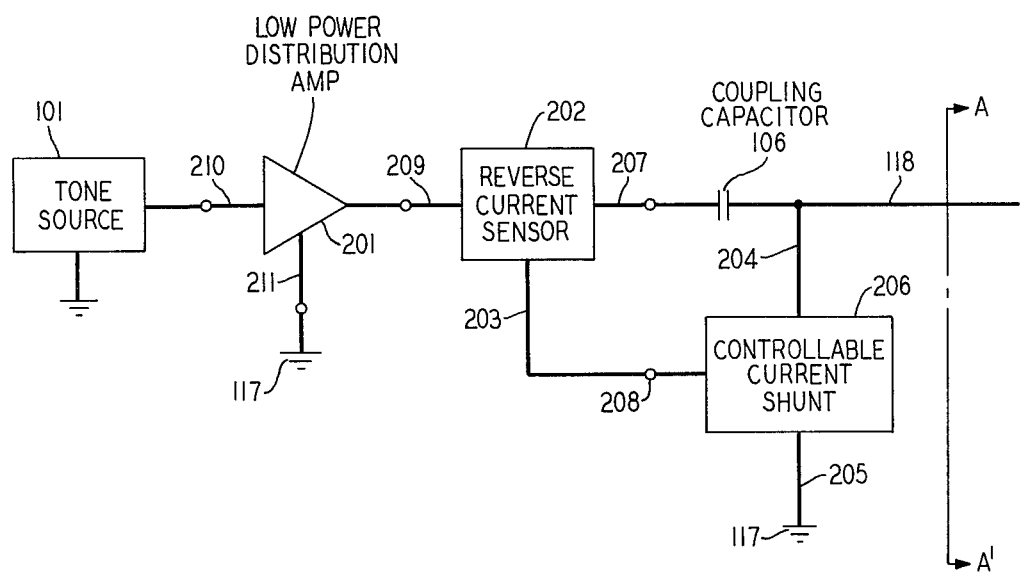
FIG. 2 shows a block diagram of an illustrative embodiment of the instant invention wherein a reverse current sensor and a controlled current shunt allow a low-power signal amplifier to be used as the driving amplifier.

FIG. 2 shows a block diagram of an illustrative embodiment of the instant invention wherein the distribution amplifier is isolated from the effects of the reverse current surges resulting from load faults.

The signals of tone source 101 are transmitted along lead 210 to the input of the low-power distribution amplifier 201 advantageously of the operational amplifier type whose ground lead 211 is connected to the common bus 117. The amplifier output is connected to current lead 209 of reverse current sensor 202. Current lead 207 of sensor 202 is connected to one terminal of coupling capacitor 106. The other terminal of capacitor 106 connects to lead 118 which goes to the distribution circuitry to the right of section line A—A' shown in FIG. 1. Output lead 203 of reverse current sensor 202 is connected to control terminal 208 of controllable current shunt 206. Main current leads 204 and 205 of controllable current shunt 206 are connected to lead 118 and common bus 117, respectively.

When a reverse current surge resulting from a faulty load propagates along lead 118 and through capacitor 106, its presence is detected by reverse current sensor 202 and a signal indicating the presence of the current surge is transmitted along lead 203 to control terminal 208 of controllable current shunt 206 so as to cause the latter to present a low impedance path between leads 204 and 205. This low impedance path diverts the main portion of the current surge to the common bus so that it never reaches the output circuits of low-power distribution amplifier 201.

When the reverse current transient subsides, the controllable current shunt returns to its normal high impedance state and the distribution system then continues to operate in its normal manner. As a result of this combination, the distribution amplifier 201 need not be rated to handle high current surges in the manner that is required of amplifier 103 in FIG. 1; rather, the power rating of amplifier 201 will be determined solely by the signal requirements of the load distribution circuitry A—A'. If the load circuitry signal power requirements are low, as is often the case with such distribution systems, the amplifier 201 may be realized as a low-power integrated circuit which is small, inexpensive, and easy to replace.

Figure 3:
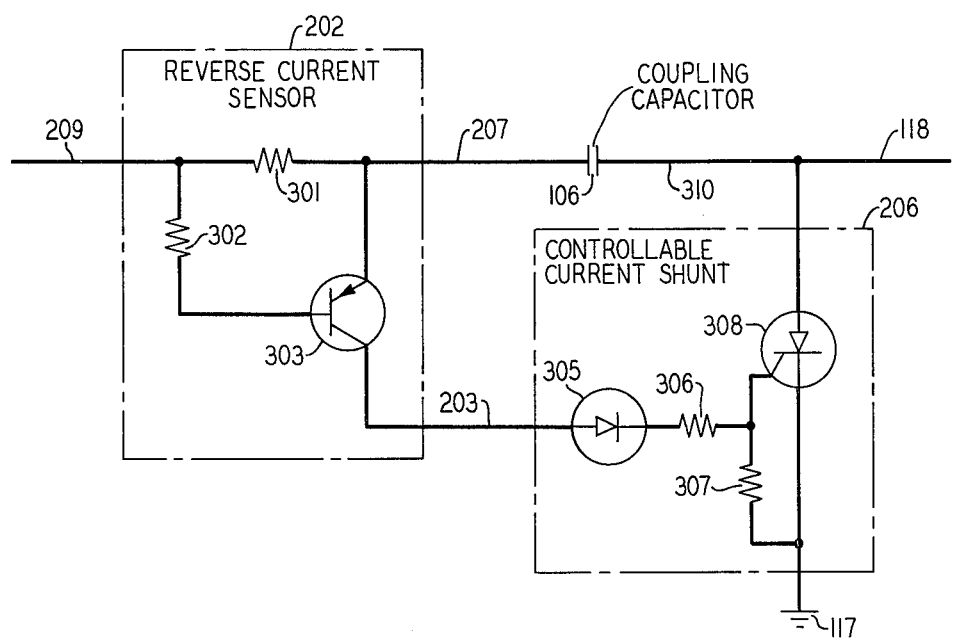
FIG. 3 shows a detailed circuit drawing of an illustrative embodiment of the reverse current sensor and controlled current shunt of FIG. 2.

FIG. 3 shows a circuit schematic of an illustrative embodiment of reverse current sensor 202 and controllable current shunt 206 depicted in FIG. 2. Lead 209 from the distribution amplifier is connected to resistors 301 and 302 which are connected to the emitter and base terminals of PNP transistor 303, respectively. The transistor emitter is also connected via lead 207 to one terminal of coupling capacitor 106. The other terminal of capacitor 106 is connected by means of lead 310 to the anode of silicon controlled rectifier (SCR) 308 and also to lead 118 which extends to the distribution circuitry A—A' as shown in FIG. 1. The collector of transistor 303 is connected via lead 203 to the anode of diode 305. The cathode of diode 305 is connected to the gate electrode of SCR 308 by means of resistor 306. The gate is, in turn, connected through resistor 307 to common bus 117. The cathode of SCR 308 is connected directly to the common bus.

When a reverse current surge due to a fault in one of the load circuits propagates along lead 118 from the voltage distribution transformer, it passes through coupling capacitor 106 and series resistor 301. This current surge causes a voltage to be developed across series resistor 301 so that PNP transistor 303 becomes strongly forward biased at its emitter-to-base-junction. The value of resistor 301 determines the threshold voltage at which transistor 303 becomes conductive. Base resistor 302 limits the base current to a value which is not damaging to transistor 303. The strong forward bias on the emitter-to-base junction of transistor 303 causes the transistor to go into saturation so that it acts substantially as a closed switch. Current flows out of the collector of transistor 303 and via lead 203 through diode 305, resistor 306, and resistor 307 to the common bus. The voltage divider effect of resistors 306 and 307 causes the gate of SCR 308 to be raised to a sufficiently high positive potential to "trigger" SCR 308 into conduction so that it presents a low impedance path between its anode and cathode terminals. The main portion of the reverse current surge is then shunted through this path.

Once the current transient has subsided, the distribution amplifier, which is connected to lead 209, continues to generate its alternating-current (AC) tone signal. When the negative half cycle of this signal reaches the anode of SCR 308, it causes it to be automatically "turned off." Once this happens, the path between the anode and cathode of the SCR returns to its high impedance state and the entire tone distribution system, except for the overloaded circuit, continues to operate normally. It should be noted that resistor 301 is of sufficiently low value that it does not degrade the normal operation of the system, but rather serves only the beneficial purpose of detecting high magnitude reverse current surges.

While the invention has been explained and described with reference to a preferred embodiment, modifications thereof will be readily apparent to those skilled in the art without departing from the spirit and scope of the invention.

What is claimed is:

1. In a signal distribution circuit having a tone signal source, a plurality of load circuits supplied by said source, a distribution transformer connected between said source and said load circuits and an amplifier coupling said source to said transformer, means for protecting said amplifier from transient surges caused by a fault in one or more load circuits comprising an overload disconnecting device in tandem between each load circuit and said distribution transformer, a switching device in shunt of the output of said amplifier, and reverse current sensing means responsive to a surge current resulting from the commencement of operation of one or more of said disconnecting devices for triggering said switching device into its conductive state, said switching device being automatically returned to its nonconductive state upon completion of a disconnection operation.

2. The signal distribution circuit defined in claim 1 in which said overload disconnecting device is a fuse rated to protect an individual load circuit.

3. The signal distribution circuit defined in claim 1 in which said switching device is a silicon controlled rectifier.

4. The signal distribution circuit defined in claim 1 in which said reverse current sensing means is a PNP transistor.

5. The signal distribution circuit defined in claim 1 in which said reverse current sensing means comprises a resistor in series between said amplifier and said distribution transformer across which a voltage is developed in response to current flowing therethrough, and a PNP transistor having its base-emitter path shunted across said resistor and rendered conductive by a voltage of a particular polarity and further having its emitter-collector path connected to trigger said switching device.

6. In combination, a tone signaling source, an amplifier for signals from said tone source, a distribution transformer having an input winding coupled to said amplifier and an output winding with one or more taps thereon, a plurality of load circuits connected singly or in groups to the taps on the output winding of said distribution transformer, a fusible disconnecting device in series with each load circuit, a current sensor in series between said amplifier and the input winding of said distribution transformer responsive to a transient surge of current due to a fault in one or more of said load circuits for providing a triggering current, and a current shunt across the output of said amplifier triggerable into a conductive state responsive to said triggering current from said current sensor for diverting current surges from a faulted load circuit away from said amplifier, said current shunt automatically returning to the nonconductive state upon the complete operation of said disconnecting device.

7. A protective circuit comprising an amplifier having an input and an output;

a distribution transformer having an input winding and an output winding, one end of said input winding being connected to said amplifier output through a capacitor;

a plurality of load circuits, each load circuit being connected to one end of said output winding through an overload disconnecting device;

a semiconductor device having an anode, a cathode and a gate electrode, said anode being connected to one end of said input winding, said cathode being connected to the other end of said input winding;

means responsive to the occurrence of an overload in one of said load circuits for switching said semiconductive device to its conductive state to prevent excessive current from being applied to said amplifier output, said semiconductive switch being responsive to the operation of the overload disconnecting device of said one load circuit to assume its nonconductive state whereby said amplifier is rendered operative and other load circuits are uninterrupted by the overload of said one load circuit.

8. A protective circuit for the output of a tone signal generator subject to undesired transient surge currents comprising a switching device in shunt of the output of said tone signal generator and having a normally nonconductive state, and reverse current sensing means responsive to a surge current exceeding a predetermined threshold level for triggering said switching device into a conductive state which substantially precludes such surge current from entering said tone signal generator, said switching device being automatically returned to a nonconductive state upon subsidence of such surge current below said threshold level.

* * * * *